(12) United States Patent
Wu et al.

(10) Patent No.: US 10,862,751 B1
(45) Date of Patent: Dec. 8, 2020

(54) PROACTIVE SERVICE REMINDER BASED ON CUSTOMER CONFIGURATION

(71) Applicant: EMC IP Holding Company LLC, Hopkinton, MA (US)

(72) Inventors: Jun Wu, Shanghai (CN); Yourong Wang, Shanghai (CN); Haitao Zhou, Shanghai (CN); Kenneth Wood, Hollis, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 327 days.

(21) Appl. No.: 15/079,197

(22) Filed: Mar. 24, 2016

(51) Int. Cl.
*H04L 12/24* (2006.01)

(52) U.S. Cl.
CPC ........ *H04L 41/082* (2013.01); *H04L 41/0866* (2013.01); *H04L 41/5041* (2013.01)

(58) Field of Classification Search
CPC ............... H04L 41/082; H04L 41/0866; H04L 41/5041
USPC .......................................................... 709/219
See application file for complete search history.

(56) References Cited

U.S. PATENT DOCUMENTS

| | | | | |
|---|---|---|---|---|
| 9,195,453 | B1 * | 11/2015 | Giammaria | ............. H04L 63/00 |
| 2004/0078727 | A1 * | 4/2004 | Little | .................. G06F 11/2257 714/48 |
| 2007/0174569 | A1 * | 7/2007 | Schnapp | ............... G06F 3/0604 711/162 |
| 2013/0080720 | A1 * | 3/2013 | Nakamura | ............ G06F 16/128 711/161 |
| 2017/0139766 | A1 * | 5/2017 | Crudele | .............. G06F 11/0781 |

* cited by examiner

*Primary Examiner* — Kevin S Mai
(74) *Attorney, Agent, or Firm* — Muirhead and Saturnelli, LLC (57) ABSTRACT

Described are techniques for determining relevant upgrades for customers. Data storage system configuration information describing existing data storage system configurations for one or more customers is received. One or more service pack documents are received. Each of the one or more service pack documents may include one or more rules denoting data storage system configuration conditions relevant to functionality performed in a software upgrade associated with each service pack document. Analysis is performed, such as by a risk analytic engine, of the data storage system configuration information in accordance with the one or more service pack documents. Processing includes identifying, in accordance with the analysis, which of the one or more service pack documents identify a software upgrade relevant to the data storage system configurations of the customers. Additionally, a customized report may be generated and proactively sent to each of the customers regarding particular upgrades relevant to each customer.

18 Claims, 5 Drawing Sheets

PROACTIVE SERVICE REMINDER BASED ON CUSTOMER CONFIGURATION

BACKGROUND

Technical Field

This application generally relates to data storage.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of determining relevant upgrades comprising: receiving a first data storage system configuration file describing a first data storage system configuration of a first data storage system of a first customer; receiving one or more service pack documents, each of the one or more service pack documents including one or more rules denoting data storage system configuration conditions relevant to functionality performed in a software upgrade associated with said each service pack document; analyzing the first data storage system configuration file in accordance with the one or more service pack documents; and identifying, in accordance with said analyzing, which of the one or more service pack documents identify a software upgrade relevant to the first data storage system configuration. The method may include generating a report in accordance with said analyzing; and sending the report to the first customer. A first of the service pack documents for a first software upgrade may include a correction for a known problem and at least one rule of the first service pack document may identify conditions of a data storage system configuration relevant for an occurrence of the known problem. A first of the service pack documents for a first software upgrade may include a new feature and at least one rule of the first service pack document may identify conditions of a data storage system configuration relevant for the new feature. A first of the service pack documents for a first software upgrade may include an optimization and at least one rule of the first service pack document may identify conditions of a data storage system configuration relevant for use of the optimization. The first data storage system configuration file may be one of a plurality of data storage system configuration files stored in a customer configuration database. The one or more service pack documents may be stored in a service pack database. The method may include modifying the first data storage system configuration of the customer to generate an updated first data storage system configuration; responsive to said modifying, accordingly updating the first data storage system configuration file and generating an updated first data storage system configuration file; and after said updating, performing processing including: analyzing the updated first data storage system configuration file in accordance with the one or more service pack documents; and identifying, in accordance with said analyzing, which of the one or more service pack documents identify a software upgrade relevant to the updated first data storage system configuration. Each service pack document may include one or more rules, and each of the one more rules may include one or more rule criteria denoting data storage system configuration conditions relevant to functionality performed in the software upgrade associated with said each service pack document. The one or more rule criteria may identify any of a configuration option or setting, a data storage service, a current state. The one or more rule criteria may identify a software version to which the software upgrade is applicable. A first of the one or more rules may include rule criteria identifying a data storage service that is a snapshot facility or data replication facility, and a current state denoting a number of snapshots. The first rule may denote a condition known to cause an occurrence of a known problem that is corrected in the software upgrade associated with said each service pack document. A first of the one or more rules may include rule criteria identifying a file system, and a current state denoting a number of files in the file system. The first rule may denote a condition known to cause an occurrence of a known problem that is corrected in the software upgrade associated with said each service pack document. A first of the one or more rules may include rule criteria identifying a data storage service that takes snapshots of a logical device having storage provisioned from a storage pool, and a current state denoting a first amount of the storage pool that has been consumed. The first rule may denote a condition known to cause an occurrence of a known problem that is corrected in the software upgrade associated with said each service pack document. The known problem may occur when a snapshot of the logical device is automatically deleted when a current amount of storage capacity consumed exceeds the first amount. Each of the one or more rules of each of the one or more service pack documents may include a severity level. The severity level may be one of a predetermined set of severity levels. The predetermined set may include a high level, a medium level, a low level, and an optimization level. The high level of severity may denote a required relevant software upgrade, the medium and low level of severity each may denote a recommended relevant software upgrade, and the optimization level may denote an optional relevant software upgrade.

In accordance with another aspect of techniques herein is a system comprising: a processor; and a memory comprising code stored therein, that, when executed, performs a method of determining relevant upgrades comprising: receiving a first data storage system configuration file describing a first data storage system configuration of a first data storage system of a first customer; receiving one or more service pack documents, each of the one or more service pack documents including one or more rules denoting data storage system configuration conditions relevant to functionality performed in a software upgrade associated with said each service pack document; analyzing the first data storage system configuration file in accordance with the one or more service pack documents; and identifying, in accordance with said analyzing, which of the one or more service pack documents identify a software upgrade relevant to the first data storage system configuration.

In accordance with yet another aspect of techniques herein is a computer readable medium comprising code stored thereon, that when executed, performs a method of determining relevant upgrades comprising: receiving a first data storage system configuration file describing a first data storage system configuration of a first data storage system of a first customer; receiving one or more service pack documents, each of the one or more service pack documents including one or more rules denoting data storage system configuration conditions relevant to functionality performed in a software upgrade associated with said each service pack document; analyzing the first data storage system configuration file in accordance with the one or more service pack documents; and identifying, in accordance with said analyzing, which of the one or more service pack documents identify a software upgrade relevant to the first data storage system configuration.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
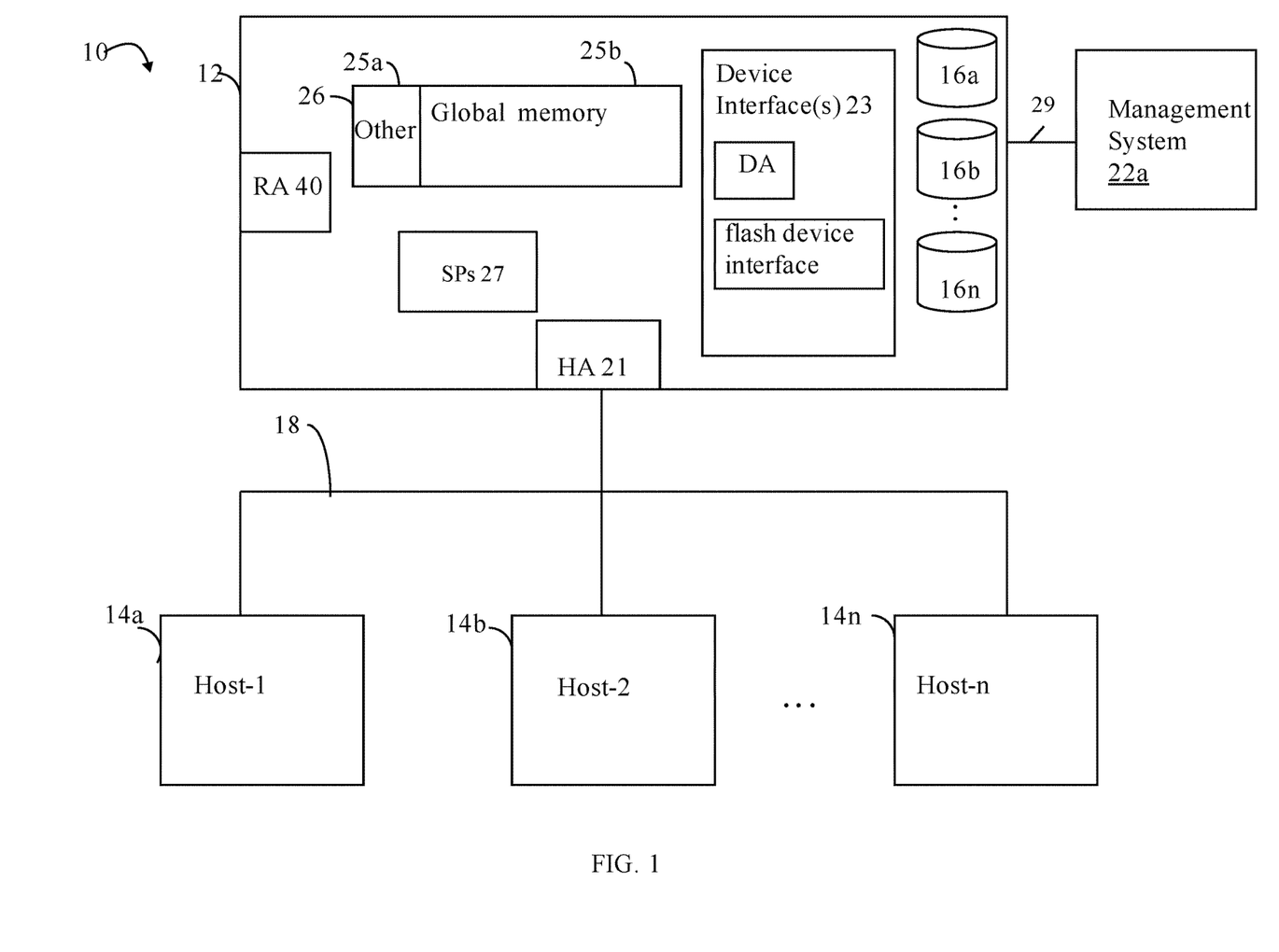
FIGS. 1 and 2 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In a data storage system, it is highly undesirable to have data stored thereon by unavailable/unreachable (DU) or otherwise experience a data loss (DL). Occurrences of DU/DL may be caused by bugs, errors or problems in data storage system software, and may occur under some specific system conditions. Once a storage provider becomes aware of such bugs, errors, or other problems in data storage system software such as in a first customer's system, a storage provider of the system software may provide the particular first customer with a correction or a solution, such as a patch or "hotfix", an upgraded version of the storage system software. Many DU/DL occurrences on other customer systems having a same or similar configuration to that of the first customer may be avoided if such other customers also apply the same patch or upgrade as the first customer prior to having such other customers experience conditions causing a DU/DL. However, some customers may not be willing to apply all upgrades and corrections to system software if the customers are not aware of the value of performing such upgrades and corrections.

Described in following paragraphs are techniques that may be used in connection with selectively and proactively reminding storage customers of what upgrades, software patches, and the like, may be beneficial for the customer based on the particular data storage system configuration of the customer's data storage system. In at least one embodiment, a process and tool may be used in connection with providing such reminders in a proactive manner in order to avoid experiencing any DU/DL occurrence. Through proactive analysis of customer data storage configuration data such as by a Risk Analytic Engine, a storage provider can notify those customers with potential DU/DL risks regarding what software corrections and upgrades to perform. Rather than perform a general notification to all customers, such a notification may be performed selectively to notify a customer only regarding particular software upgrades and corrections relevant to the customer's data storage system configuration. Thus, techniques herein provide for customized notifications to customers while also avoid notifying a customer regarding a software upgrade or correction that is not relevant to the particular customer's data storage system configuration.

Generally, a data storage system configuration of a customer may be described in a configuration file. The configuration file may denote aspects of the data storage configuration such as, for example, the configuration of storage pools (e.g., type of physical storage devices such as flash drives, particular rotating disk drives, RAID group or level, number of physical storage devices), data protection and other data services performed (e.g., snapshot facility, remote data protection facility, file system, data storage optimizer), current usage or consumption of different storage pools, RAID groups, logical devices or groups of logical devices, particular versions of software and hardware components installed and running in the data storage system, and the like.

Figure 2:
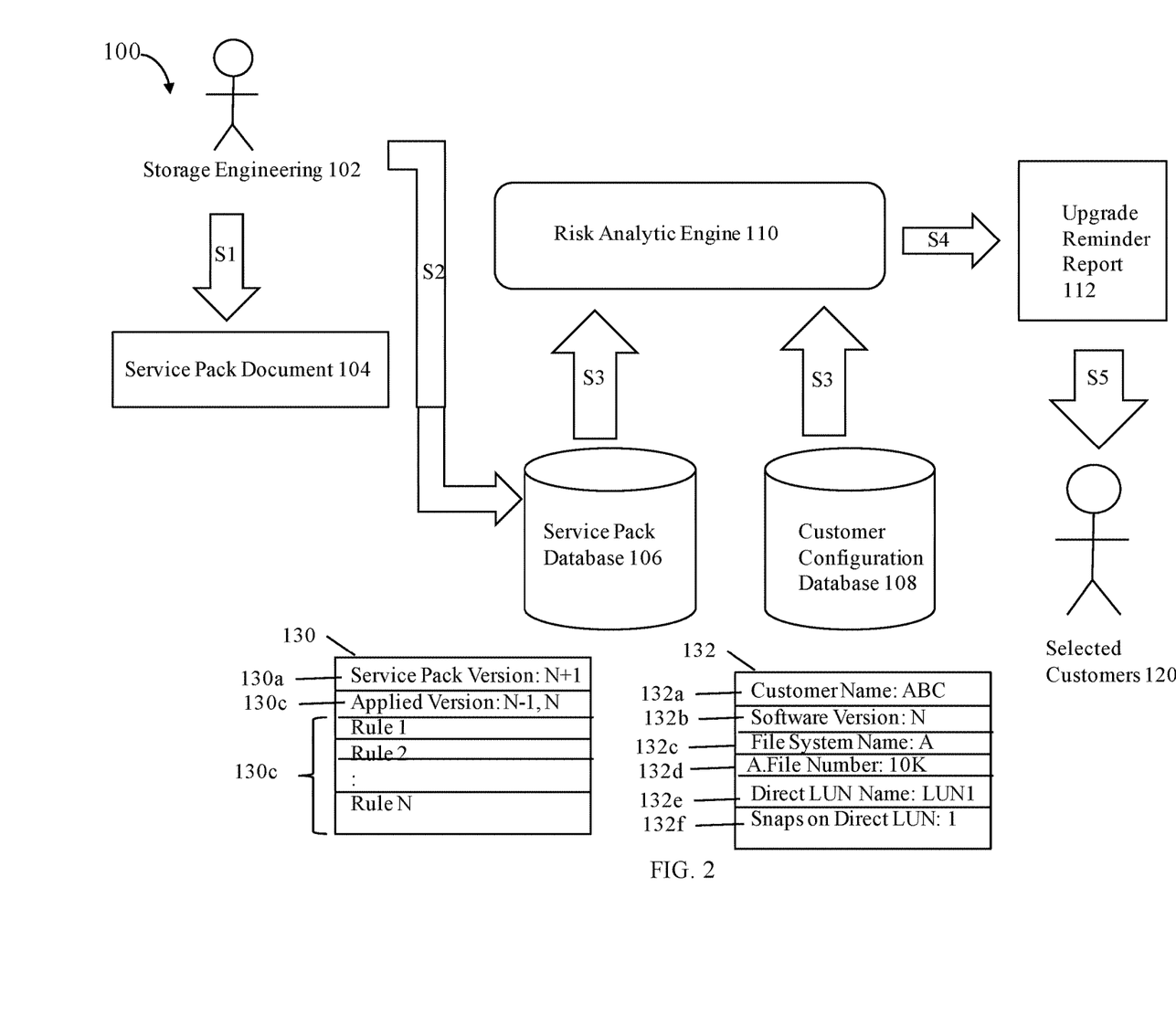

Referring to FIG. 2, shown is an example architecture 100 illustrating components and data flow in an embodiment in accordance with techniques herein. At various points in time, a service pack for data storage system software may be generated for installation and use on customer data storage systems. A service pack may generally be characterized as a correction, upgrade, and the like, provided as a solution to one or more bugs or problems with a particular version of software. A service pack may be provided at different points in time in efforts to provide a software fix to customers. In following paragraphs, description and examples may refer to data storage systems and a resulting condition of DU/DL. However, techniques herein may more generally by applied for use in any suitable software environment and in connection with other conditions besides DU/Dl.

At a first step S1, storage engineering 102 may generate a service pack document which describes fixes list to resolve a reporting problem or bug that may cause DU/DL. In this example, assume that the next service pack to be generated is "N+1", N being an integer greater than 1 where N denotes a current or the last service pack provided to customers. The service pack document 104 for service pack N+1 may be generated by storage engineering and may describe the bug fixes or corrections included in service pack N+1 and also identify the particular conditions or configuration settings which may trigger an occurrence of a DU/DL. The service pack document 104 may summarize patterns of the known bugs or problems and identify in the form of rules the particular conditions that the bugs or problems may occur.

In a step S2, the service pack document 104 may be placed in the service pack database 106. Generally, the service pack database 106 may be a data container including the various service pack documents for the current version "N+1" as well as previous service packs, such as versions "N", N−1", and the like.

Element 130 is an example illustrating information of a service pack document 104 as may be stored in the service pack database 106 for each service pack. As illustrated by element 130, a service pack document may include the following information:

Information 130a identifies the service pack version (e.g., "N+1") that this entry or service pack document 130 describes.

Information 130b identifies the one or more versions of prior service packs, or more generally versions of software, to which this current service pack "N+1" may be applied. Generally, element 130b identifies the upgrade path to be followed to use service pack "N+1". For example, elements 130a-130b in combination indicate that service pack "N+1" may be applied to a system currently running with installed service pack "N" or "N−1". More generally, element 130b may denote a version associated with a previous service pack as well as a prior version of other installed software on the data storage system to which the current service pack "N+1" is applicable.

Information 130c identifies a set of one or more rules denoting conditions in connection with a configuration of the data storage system which may cause DU/DL. Additionally, the foregoing conditions of the rule identify conditions related to the correction or fix of this service pack. Thus, evaluation of a rule to true whereby the rule matches existing conditions in a current data storage system configuration of a data storage system means that the data storage system is at risk of a DU/DL occurrence and should apply this service pack.

For example, the rules 130c of the service pack document 130 may include the following 2 rules:

Rule 1: Version N−1 or Version N, File number>8000, Severity: high;

Rule 2: Version N, Snapshot on LUN>0, Severity: high

Rule 1 indicates that service pack "N+1" corrects a DU/DL problem that may occur in a data storage system that is running service pack version "N−1" or "N" (or other version N−1 or N of the system software) having more than 8000 files. In this case, the resulting problem or bug that may occur has a high severity. In this example, an indication of a high severity level may denote an occurrence of a DU/DL. In connection with Rule 1, the items of "Version N−1 or Version N, File number>8000" may denote rule criteria that is evaluated to see if it matches information in a particular customer's data storage configuration information as stored in the database 108.

Rule 2 indicates that service pack "N+1" corrects a DU/DL problem that may occur in a data system that is running service pack version "N" (or other version N of the system software) having a snapshot of a LUN. In this case, the resulting problem or bug that may occur has a high severity. In this example, an indication of a high severity level may denote an occurrence of a DU/DL. In connection with Rule 2, the items of "Version N, Snapshot on LUN>0" may denote rule criteria that is evaluated to see if it matches information in a particular customer's data storage configuration information as stored in the database 108.

The customer configuration database 108 may include data storage system configuration information for each supported customer's data storage system. Element 132 is an example illustrating some information regarding a particular customer's data storage system configuration that may be stored in the database 108. Element 132 may include the following information:

132a the customer name or identifier (e.g., customer ABC), 132b the current software version or service pack level "N" currently installed and running on the customer's data storage system;

132c the file system name "A" in the current configuration on the customer's system;

132d the number of files in file system A. In this example, the number of files in file system "A" is 10,000 (10K);

132e a LUN, LUN 1, currently having storage provisioned; and 132f identifying the number of snapshots, 1, currently created and in existence on the data storage system for LUN 1.

It should be noted that elements 130 and 132 are merely simple examples illustrating only some information that may be included, respectively, in the service pack database 106 the customer configuration database 108.

In a step S3, the risk analytic engine 110 may read from the databases 106 and 108 whereby the engine 110 analyzes data storage system configurations of customers from 108 in accordance with service pack documents of 106 to identify targeted customers that would benefit from particular service packs (from database 106) based on current data storage system configuration information of such targeted customers (as included in database 108). In particular, the engine 110 may perform rule matching between rules of the different service packs of 106 and the different data storage system configurations of 108. If there is a match between information in a particular data storage system configuration and one or more rules of a service pack, in step S4 the engine 110 generated an upgrade reminder report 112 customized for the particular customer. The report 112 may identify the service pack along with additional information explaining details of why the upgrade is needed. Such details may be determined in accordance with the particular one or more rules of the service pack that match particular configuration information in the customer's data storage system configuration as stored in 108.

For example, assume element 130 identifies a service pack document including one or more rules matching information in the customer data storage configuration file 132 for customer ABC. Assume further that the rules 130c include the two rules noted above as Rule 1 and Rule 2. In this case Rule 1 including "Version N or N−1, File number>8000, Severity: high", evaluates to true or matches configuration information of 132. In particular, element 132a indicates that the current version of the software in the configuration is "N", element 132c indicates that the configuration includes a file system A, and element 132d indicates that file system A has 10,000 files. In connection with rule evaluation when applying the information in 132, the rule criteria evaluates to true in that Rule 1 criteria of "Version N" matches element 132b, and file number>8000 matches element 132d (e.g., 10,000 is larger than 8,000 files). Additionally, Rule 2 including "Version N, Snapshot on LUN>0, Severity: high" also evaluates to true or matches configuration information of 132. In particular, element 132a indicates that the current version of the software in the configuration is "N", elements 132e and f indicate that there is a single snapshot of LUN 1 in the configuration. In connection with rule evaluation when applying the information in 132, the rule criteria evaluates to true in that Rule 2 criteria of "Version N" matches element 132b, and Rule 2 criteria of "snapshot on LUN>0" matches elements 132e and 132f.

In this case, the report 112 may include information regarding the particular Rule 1 and Rule 2 that evaluate to true or match information in the data storage system configuration 132 for the customer "ABC". For example, the report 112 may indicate that there have been reported DU/DL occurrences in systems running Version N of the system software where the system has more than 8,000 files (e.g., Rule 1) and also in systems running Version N of the system software where the system includes LUN snapshots (e.g., Rule 2). Additionally, based on information regarding the customer's current configuration, analysis has determined that the current data storage system configuration is running Version N of the software, has 10,000 files and a snapshot of LUN 1 thereby indicating that the customer's system is at risk of a DU/DL and should upgrade or apply service pack N+1 (or system software version N+1) which includes software updates correcting problems known to cause DU/DL under the foregoing conditions.

In a step S5, the detailed upgrade reminder report 112 may be sent the customer. In contrast, another second customer "XYZ" may have a second data storage system configuration file stored in 108 where the risk analytic engine 110 processing does not result in any rules of any service pack documents in 106 evaluating to true or matching the second data storage system configuration file. In this case, no report is generated and no report is thus sent to the customer "XYZ" with upgrade reminders.

In an embodiment in accordance with techniques herein, any one or more of the risk analytic engine 110, service pack database 106 and customer configuration database 108 may be located at a node, or more generally a point of network connectivity, on the internet or other network connected to the various customer data storage systems. For example, the customer configuration database 108 may be located at a node or more generally a point of network connectivity on the internet. In this manner, customer configuration files may be uploaded from customer data storage systems to the customer configuration database. Such uploads for each customer data storage system may be performed at various different points in time in an ongoing manner. For example, changes to customer configuration file may be uploaded periodically at regular defined time intervals, responsive to any change in data storage configuration, and the like.

It should be noted that the foregoing example includes rules with rule criteria denoting conditions where a problem or bug occurs having an associated severity level, such as HIGH. An embodiment may further include one or more additional severity levels associated with bug fixes or corrections included in a software upgrade. For example, an embodiment may also have a MEDIUM and LOW severity level where a rule may specify a severity level that is any of HIGH, MEDIUM or LOW.

More generally, the rule may denote conditions of when a particular functionality of a software upgrade may be applicable or relevant to a particular customer. For example, the rule may include criteria identifying conditions, such as particular configuration settings, options or conditions, which would benefit from an optimization or other feature included in a particular software upgrade. For a rule having rule criteria identifying conditions for when an optimization or other feature may be relevant to a particular customer, the rule's severity may indicate "OPT" for optimization. In this manner, an embodiment may include information in each rule to distinguish rules denoting error conditions, bug fixes and corrections, from optimizations or other features which provide an added benefit or added feature/functionality.

When performing the rule matching, the risk analytic engine 110 may additionally perform filtering to only report out software upgrade reminders for one or more specified severity levels. For example, consider an embodiment including severity levels of OPT, LOW, MEDIUM and HIGH as noted above. The risk analytic engine 110 may perform processing to only include in customer reports matching rules that have an associated severity level that is one of a predetermined set of one or more severity levels.

For example, it may be that the customer only wants notification regarding upgrades for HIGH and OPT severity level items. In this case, the engine 110 would only include upgrade reminders for rules matching the customer's configuration information and additionally where such matching rules have a severity of HIGH or OPT. As another example, it may be that a second customer wants notification regarding upgrades for all 4 severity levels of LOW, MEDIUM, HIGH and OPT. In this case, the engine 110 would include upgrade reminders for rules matching the customer's configuration information and additionally where such matching rules have a severity of HIGH, MEDIUM, LOW or OPT. It may be that, for example, severity level of HIGH denotes a required upgrade and a severity level of LOW or MEDIUM may denote a recommended upgrade and a severity level of OPT may denote an optional upgrade.

In this manner, techniques described herein may be used to notify customers of relevant upgrades in a proactive manner, such as prior to the customer experiencing a DU/DL occurrence. By conducting risk analysis of data storage configuration information for customers, a data storage system provider can identify which customers need to conduct an upgrade or would otherwise benefit from features in the upgrade and make an accurate recommendation to the customers. Thus, techniques herein proactively provide upgrade reminders to targeted customer with detailed justification based on configuration analysis to facilitate the customers avoiding DU/DL issues based on configuration analysis. In such embodiments as described herein, each customer may have the final decision to upgrade or not according to their business situation.

Figure 3:
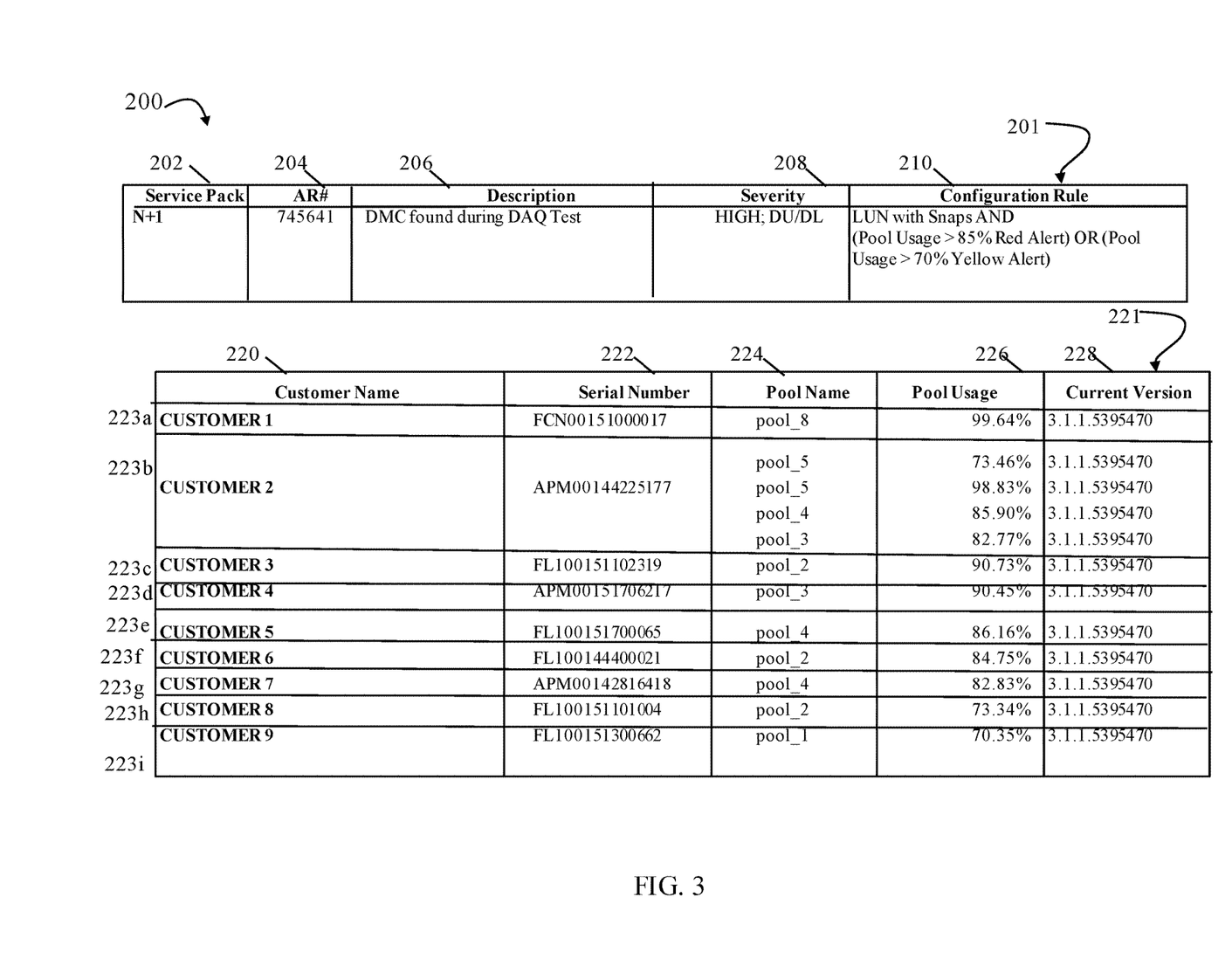
FIG. 3 is an example illustrating a rule and customer configuration data in an embodiment in accordance with techniques herein.

Referring to FIG. 3, shown is another example illustrating use of a rule in connection with techniques herein. The example 200 includes elements 201 and 221. Element 201 denotes information that may be included in a service pack document for version "N+1" (column 202) in the service pack database 106. Also in element 221 is a reporting problem tracking identifier 204, a description 206 of the problem, a severity 208, and the rule 210 for the service pack "N+1". In this example, columns 208 and 210 indicate a severity that is HIGH denoting that a DU/DL may result from configuration conditions set forth in rule 210. The rule 210 evaluates to true and thus matches a data storage system configuration having a LUN or logical device with one or more snapshots and additionally where the LUN is configured from a pool of physical storage devices having a current consumption or usage that is more than 70% denoting a yellow or medium alert or otherwise more than 85% denoting a red/high alert. It should be noted that the rule 210 also includes an alert level where the higher the level of consumed or used pool capacity, the greater the urgency to install the upgrade to service pack N+1.

In particular rule 210 is associated with problem AR #745641 that occurs when a storage pool automatically deletes one or more snapshots of a LUN provisioned from the storage pool as the current amount of the storage capacity of the pool consumed exceeds one of the thresholds of 75% and 80% of the total pool capacity (e.g., where the foregoing conditions are denoted by rule 210). Service pack "N+1" in this example 201 includes a correction to the foregoing problem. The example 200 also includes a table 221 of customers identified by the risk analytic engine 110 performing processing as described above. In particular, in this example, the information in table 221 may be generated by the engine 110 performing rule matching of the rule 210 in 201 against existing data storage system configuration information as stored in the customer configuration database 108 for the customers identified in column 220 of table 221.

Table 221 includes a row for each identified customer having a configuration matching rule 210 where each row includes a customer name 220, a serial number 222 of the data storage system having the matching configuration, one or more pool names 224, pool usage 226 and the current version 228 of system software installed and running on the particular data storage system having the serial number identified in column 222.

Row 223a indicates that Customer 1 has a single pool with an associated configuration matching rule 210. Row 223b indicates that Customer 2 has 4 pools each with an associated configuration matching rule 210. Rows 223c-i indicate that Customers 3-9 each have a single pool (e.g., see column 224) with an associated configuration matching rule 210.

In connection with the rule, it should be noted that the red alert when pool usage exceeds 85% of total pool capacity denote a higher risk set of conditions that those associated with the yellow alert condition denoted when the pool capacity exceeds 70% but also does not exceed 85%. The associated alerts of yellow and red may denote, respectively, medium and high risk levels of the particular problem or error occurring. In this case, as the pool consumption increases from 70%, so does the risk of the problem causing DU/DL. An embodiment may associate a risk level of occurrence such as yellow and red alert described above to denoting the increased probability or likelihood of the DU/DL occurring as the pool consumption increases from 70% to exceed 85%. An embodiment may generally specify rules having no risk levels (e.g., per examples described elsewhere herein) or more than 2 risk levels.

What will now be described are flowcharts of processing steps that may be performed in an embodiment in accordance with techniques herein where the flowcharts generally summarize processing described above.

Figure 4:
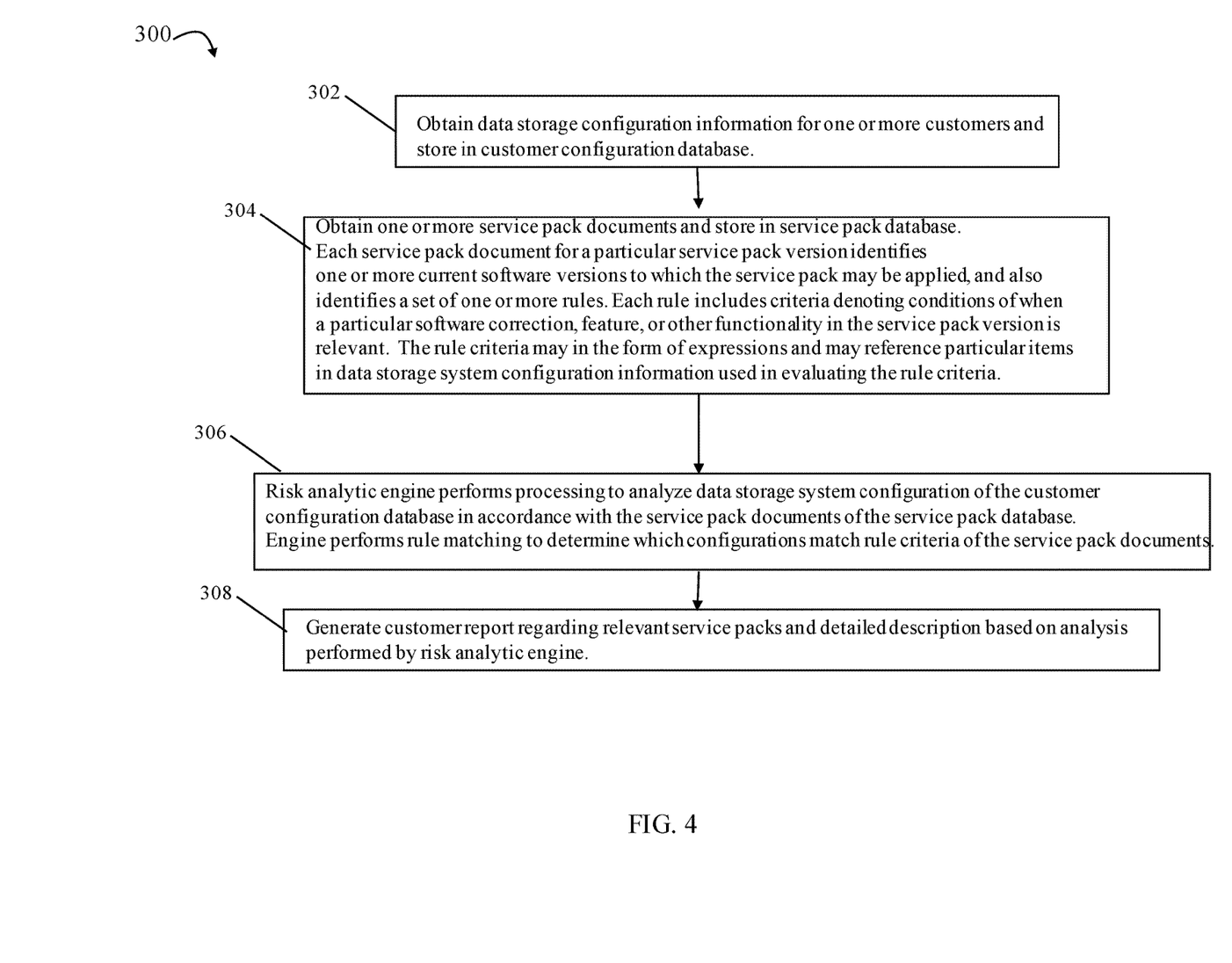
FIGS. 4 and 5 are flowcharts of processing steps that may be performed in an embodiment in accordance with techniques herein.

Referring to FIG. 4, shown is a first flowchart 300 of processing that may be performed in an embodiment in accordance with techniques herein. At step 302, data storage configuration information may be obtained for one or more customers and stored in the customer configuration database. At step 304, one or more service pack documents are obtained and store in the service pack database. Each service pack document for a particular service pack version may identify one or more current software versions to which the service pack may be applied, and also may identify a set of one or more rules. Each rule may include criteria denoting conditions of when a particular software correction, feature, or other functionality in the service pack version is relevant. The rule criteria may in the form of expressions and may reference particular items in data storage system configuration information used in evaluating the rule criteria. Additionally, each rule may denote a severity level. At step 306, the risk analytic engine may perform processing to analyze data storage system configuration of the customer configuration database in accordance with the service pack documents of the service pack database. The engine may perform rule matching to determine which configurations match rule criteria of the service pack documents. At step 208, a customer report may be generated for each customer having a data storage configuration file in the customer configuration database. The report for a customer may include one or more relevant service packs and may include a detailed description of the upgrade and particular points relevant to the customer's configuration based on the analysis performed by the risk analytic engine in step 306.

Figure 5:
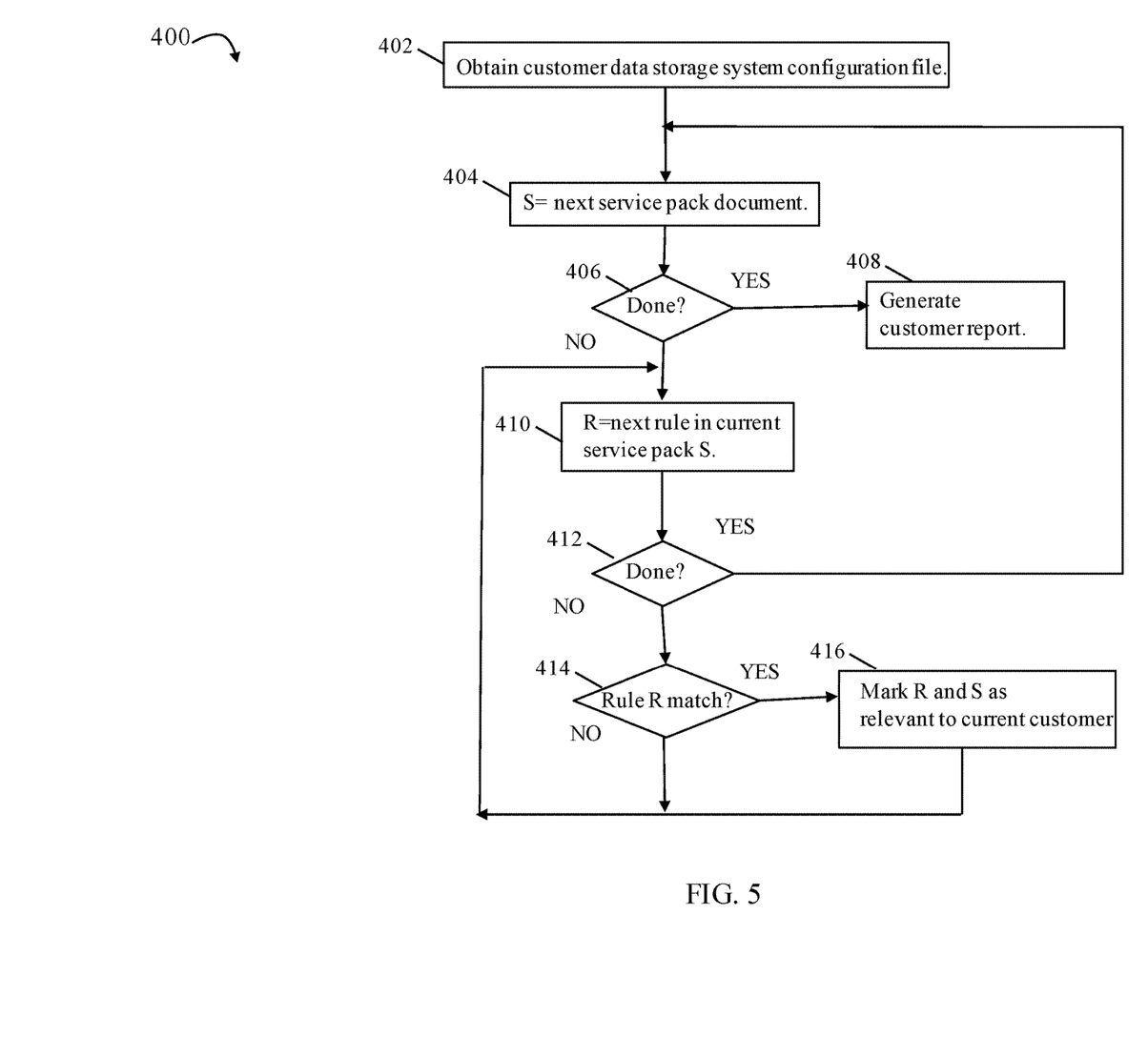

Referring to FIG. 5, shown is a second flowchart 400 of processing that may be performed in an embodiment in accordance with techniques herein. The flowchart 400 provides additional detail regarding step 306 as performed by the risk analytic engine for each customer data storage system configuration file in the customer configuration database. At step 402, the customer configuration file to be processed is obtained. At step 404, S is assigned the next service pack document in the service pack database. At step 406, a determination is made as to whether all service pack documents in the service pack database have been processed. If step 406 evaluates to yes, control proceeds to step 408 to generate the report for the customer having the particular configuration in the data storage configuration file just processed. If step 406 evaluates to no, control proceeds to step 410 to obtain R, the next rule in the current service pack S. At step 412, a determination is made as to where all rules in the current service pack document S have been processed. If step 412 evaluates to yes, control proceeds to step 404 to process the next service pack document. If step 412 evaluates to no, control proceeds to step 414 where a determination is made as to whether the current rule R matches information in the data storage system configuration file being processed. Step 412 may include evaluating the criteria of rule R in accordance with information in the data storage system configuration file to determine whether the configuration information matches conditions denoted in the rule criteria. If step 414 evaluates to yes, control proceeds to step 416 to mark R and S as relevant to the current customer. From step 416, control proceeds to step 410 to process the next rule in the current service pack document S. If step 414 evaluates to no, control proceeds directly to step 410.

In this manner, a service pack document including multiple rules may be determined as relevant to a customer's data storage system configuration if any one or more rules match information describing the customer's data storage system configuration.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of determining relevant upgrades comprising:
   receiving, using a processor, a first data storage system configuration file describing a first data storage system configuration of a first data storage system of a first customer, wherein the first data storage system configuration file includes first information indicating the first data storage system includes a first logical device having storage provisioned from a first storage pool and includes at least one snapshot of the first logical device;
   receiving, using a processor, one or more service pack documents, each of the one or more service pack documents including one or more rules denoting data storage system configuration conditions relevant to functionality performed in a software upgrade associated with said each service pack document, wherein a first rule of a first of the one or more service pack documents indicates that a known problem occurs when a snapshot of a logical device is automatically deleted responsive to a current consumption level of the first storage pool exceeding a specified threshold;

analyzing, using a processor, the first data storage system configuration file in accordance with the one or more service pack documents, wherein said analyzing includes matching the first rule of the first service pack to the first information in the first data storage configuration file;

identifying, in accordance with said analyzing and using a processor, a set of one or more relevant service pack documents each identifying a software upgrade relevant to the first data storage system configuration, wherein each service pack document of the set includes a rule with rule criteria that matches configuration information of the first data storage system configuration file, wherein the rule includes information distinguishing between whether the rule corresponds to a feature adding functionality or a correction of an error in existing functionality, wherein the first service pack document is included in the set and includes the first rule that matches the first information of the first data storage system configuration file, and wherein each service pack document of the set has an associated severity level;

filtering, using a processor, the set in accordance with at least one specified customer severity level and generating a filtered set that only includes service pack documents of the set having an associated severity level matching the at least one specified customer severity level, wherein the at least one specified customer severity level denotes a particular severity level that is associated with a service pack document of interest to the first customer, wherein the filtered set includes the first service pack document; and installing, using a processor on the first data storage system of the first customer, a first software upgrade associated with the first service pack document.

2. The method of claim 1, further comprising:
generating a report in accordance with the filtered set; and
sending the report to the first customer.

3. The method of claim 1, wherein the first of the service pack documents for the first software upgrade includes a correction for the known problem and the first rule of the first service pack document identifies conditions of a data storage system configuration relevant for an occurrence of the known problem.

4. The method of claim 1, wherein a second of the service pack documents for a first software upgrade includes a new feature and at least one rule of the second service pack document identifies conditions of a data storage system configuration relevant for the new feature.

5. The method of claim 1, wherein a second of the service pack documents for a first software upgrade includes an optimization and at least one rule of the second service pack document identifies conditions of a data storage system configuration relevant for use of the optimization.

6. The method of claim 1, wherein the first data storage system configuration file is one of a plurality of data storage system configuration files stored in a customer configuration database, and the one or more service pack documents are stored in a service pack database.

7. The method of claim 1 further comprising:
modifying the first data storage system configuration of the customer to generate an updated first data storage system configuration;
responsive to said modifying, accordingly updating the first data storage system configuration file and generating an updated first data storage system configuration file; and
after said updating, performing processing including:
analyzing the updated first data storage system configuration file in accordance with the one or more service pack documents; and
identifying, in accordance with said analyzing, which of the one or more service pack documents identify a software upgrade relevant to the updated first data storage system configuration.

8. The method of claim 1, wherein said each service pack document includes one or more rules, and each of the one more rules including one or more rule criteria denoting data storage system configuration conditions relevant to functionality performed in the software upgrade associated with said each service pack document.

9. The method of claim 8, wherein the one or more rule criteria identify any of a configuration option or setting, a data storage service, a current state.

10. The method of claim 9, wherein the one or more rule criteria identify a software version to which the software upgrade is applicable.

11. The method of claim 1, wherein the first rule includes rule criteria identifying a data storage service that is a snapshot facility, and a current state denoting a number of snapshots, and wherein the first rule denotes a condition known to cause an occurrence of the known problem that is corrected in the software upgrade associated with the first service pack document.

12. The method of claim 9, wherein a second rule of another of the one or more service pack documents includes rule criteria identifying a file system, and a current state denoting a number of files in the file system, and wherein the second rule denotes a condition known to cause an occurrence of another known problem that is corrected in the software upgrade associated with the second service pack document.

13. The method of claim 1, wherein each of the one or more rules of each of the one or more service pack documents includes a severity level.

14. The method of claim 13, wherein the severity level is one of a predetermined set of severity levels.

15. The method of claim 14, wherein the predetermined set includes a high level, a medium level, a low level, and an optimization level.

16. The method of claim 15, wherein the high level of severity denotes a required relevant software upgrade, the medium and low level of severity each denote a recommended relevant software upgrade, and the optimization level denotes an optional relevant software upgrade.

17. A system comprising:
at least one processor; and
at least one memory comprising code stored therein, that, when executed, performs a method of determining relevant upgrades comprising:
receiving a first data storage system configuration file describing a first data storage system configuration of a first data storage system of a first customer, wherein the first data storage system configuration file includes first information indicating the first data storage system includes a first logical device having storage provisioned from a first storage pool and includes at least one snapshot of the first logical device;

receiving one or more service pack documents, each of the one or more service pack documents including one or more rules denoting data storage system configuration conditions relevant to functionality performed in a software upgrade associated with said each service pack document, wherein a first rule of a first of the one or more service pack documents indicates that a known problem occurs when a snapshot of a logical device is automatically deleted responsive to a current consumption level of the first storage pool exceeding a specified threshold;

analyzing the first data storage system configuration file in accordance with the one or more service pack documents, wherein said analyzing includes matching the first rule of the first service pack to the first information in the first data storage configuration file;

identifying, in accordance with said analyzing, a set of one or more relevant service pack documents each identifying a software upgrade relevant to the first data storage system configuration, wherein each service pack document of the set includes a rule with rule criteria that matches configuration information of the first data storage system configuration file, wherein the rule includes information distinguishing between whether the rule corresponds to a feature adding functionality or a correction of an error in existing functionality, wherein the first service pack document is included in the set and includes the first rule that matches the first information of the first data storage system configuration file, and wherein each service pack document of the set has an associated severity level;

filtering the set in accordance with at least one specified customer severity level and generating a filtered set that only includes service pack documents of the set having an associated severity level matching the at least one specified customer severity level, wherein the at least one specified customer severity level denotes a particular severity level that is associated with a service pack document of interest to the first customer, wherein the filtered set includes the first service pack document; and installing, on the first data storage system of the first customer, a first software upgrade associated with the first service pack document.

18. A non-transitory computer readable medium comprising code stored thereon, that when executed, performs a method of determining relevant upgrades comprising:

receiving, using a processor, a first data storage system configuration file describing a first data storage system configuration of a first data storage system of a first customer, wherein the first data storage system configuration file includes first information indicating the first data storage system includes a first logical device having storage provisioned from a first storage pool and includes at least one snapshot of the first logical device;

receiving, using a processor, one or more service pack documents, each of the one or more service pack documents including one or more rules denoting data storage system configuration conditions relevant to functionality performed in a software upgrade associated with said each service pack document, wherein a first rule of a first of the one or more service pack documents indicates that a known problem occurs when a snapshot of a logical device is automatically deleted responsive to a current consumption level of the first storage pool exceeding a specified threshold;

analyzing, using a processor, the first data storage system configuration file in accordance with the one or more service pack documents, wherein said analyzing includes matching the first rule of the first service pack to the first information in the first data storage configuration file;

identifying, in accordance with said analyzing and using a processor, a set of one or more relevant service pack documents each identifying a software upgrade relevant to the first data storage system configuration, wherein each service pack document of the set includes a rule with rule criteria that matches configuration information of the first data storage system configuration file, wherein the rule includes information distinguishing between whether the rule corresponds to a feature adding functionality or a correction of an error in existing functionality, wherein the first service pack document is included in the set and includes the first rule that matches the first information of the first data storage system configuration file, and wherein each service pack document of the set has an associated severity level;

filtering, using a processor, the set in accordance with at least one specified customer severity level and generating a filtered set that only includes service pack documents of the set having an associated severity level matching the at least one specified customer severity level, wherein the at least one specified customer severity level denotes a particular severity level that is associated with a service pack document of interest to the first customer, wherein the filtered set includes the first service pack document; and installing, using a processor on the first data storage system of the first customer, a first software upgrade associated with the first service pack document.

* * * * *